United States Patent [19]

Schmidt et al.

[11] Patent Number: 5,219,593
[45] Date of Patent: Jun. 15, 1993

[54] INJECTION MOLDING APPARATUS

[75] Inventors: Harald Schmidt; Bruce Catoen, both of Georgetown, Canada

[73] Assignee: Husky Injection Molding Systems Ltd., Bolton, Canada

[21] Appl. No.: 822,984

[22] Filed: Jan. 21, 1992

[51] Int. Cl.[5] .............................................. B29C 45/73
[52] U.S. Cl. ................................ 425/549; 264/328.15; 264/328.16; 425/552
[58] Field of Search ............... 425/547, 549, 570, 572, 425/552; 264/328.15, 328.16

[56] References Cited

U.S. PATENT DOCUMENTS

| | | | |
|---|---|---|---|
| 4,761,343 | 8/1988 | Gellert | 425/570 |
| 4,808,106 | 2/1989 | Von Holdt | 425/547 |
| 5,002,480 | 3/1991 | Gellert et al. | 425/549 |
| 5,013,513 | 5/1991 | Schad et al. | 264/328.15 |
| 5,055,028 | 10/1991 | Trakas | 425/549 |
| 5,135,377 | 8/1992 | Gellert | 264/328.15 |

OTHER PUBLICATIONS

Webster's Ninth New Collegiate Dictionary, 1983, p. 469.

*Primary Examiner*—Tim Heitbrink
*Attorney, Agent, or Firm*—Bachman & LaPointe

[57] ABSTRACT

Apparatus provides a large opening for rapid filling of a mold cavity and includes a heated injection nozzle adjacent the mold cavity, an elongated inlet conduit from the injection nozzle to the mold cavity, a channel in the heated injection nozzle communicating with the inlet conduit and cooling channels adjacent the inlet conduit to cool the inlet conduit operative to freeze resin in the inlet conduit after filling the mold cavity.

18 Claims, 6 Drawing Sheets

INJECTION MOLDING APPARATUS

BACKGROUND OF THE INVENTION

In order to injection mold large articles having thin walls, it is well known that the injection phase of the process must be accomplished very quickly in order to fill the mold cavity completely before the resin has had time to cool sufficiently to impede filling. Methods of doing this have included precompression molding, multiple gates in the same mold cavity or using a single large diameter valve gate.

Precompression molding uses a shut off nozzle valve which remains closed until the resin in the injection unit had been compressed to the full injection pressure, typically 20,000-40,000 psi. Then the nozzle is pressed against the mold sprue bushing and automatically opens to allow the precompressed resin to literally explode into the empty cavity, filling it almost instantly. This process has several disadvantages which include rapid shear heating of the resin as it flows through the comparatively small gate in the cavity. This causes resin degradation. A second disadvantage is the difficulty in trying to vent the air in the mold cavity quickly enough to prevent "dieseling", that is burning of the melt front by the rapidly heated air. Increasing the vents to solve this problem increases the possibility of flashing the mold. Alternatively, relaxing the mold clamping force, even temporarily in the cycle, to allow the mold to "breathe" causes core shifting and alignment problems.

Multiple gates feeding the same mold cavity incur the additional expense of providing the nozzles and their associated hot runner manifold for supplying them. This method also introduces several simultaneous melt fronts into the cavity resulting in flow marks and the possibility of trapping gas in the mold between the melt fronts. U.S. Pat. No. 5,013,513 to Schad et al. is an example of multiple gating a thin wall part.

Large diameter mechanical valve gates offer the possibility of presenting a large opening in the mold cavity to allow rapid filling without degrading the resin. However, large diameter valve gates have not been entirely satisfactory. Copending U.S. patent applications Ser. Nos. 707,660 and 707,666 both abandoned, filed May 30, 1991, show such arrangements. The inherent problem with this style of gate is the conflicting requirement to both cool the valve's molding surface while heating the valve stem. By adding cooling and heating provisions in the valve stem, the structural strength of the stem is considerably weakened, risking collapse under injection and holding pressures which must be resisted when the valve is near closing.

U.S. Pat. No. 4,808,106 to von Holdt shows a "Flex Gate". This large diameter valve gate has no moving parts in the accepted sense, however the valve action is caused by injection pressure bending the valve structure during injection. The removal of melt pressure allows the valve to close as the elastic valve structure resumes its former undeflected state. The inherent problems of heating and cooling the valve stem are also present in this configuration, coupled with the comparative stiffness of the valve. Considerable melt pressure must be built up prior to the valve's opening, while closing may occur at such a high pressure that maintaining a hold pressure on the melt in the cavity as the resin cools may prove detrimental. The intermittent contact between the valve stem and the nozzle body will cause wear to occur, so even this "non-moving" design will suffer wear.

It is well known in the art that "flash" gating or fan gating using a wide edge gate in conventional cold runner molding provides a comparatively large opening for the rapid filling of parts. After the part has cooled and the mold opens, the attached runner and gate are removed leaving the usual gating mark on the edge of the part.

The principle of hot tip or hot edge nozzle is also well known. The constantly heated nozzle tip maintains the resin melted behind a frozen "plug" of resin in the gate. The application of injection pressure to the melted resin in the nozzle channel causes the frozen plug to be blown in to the mold cavity effectively opening the gate to permit the melted resin to fill the cavity. After the flow of resin stops, when the mold cavity is filled, the cooled gate area freezes the plastic locally into a "plug" to prevent melt drooling into the cavity, while the heated nozzle maintains the resin in the nozzle channel molten. The cycle is then repeated. These types of nozzles have no moving parts and to date have been limited to small gate diameters, typically 0.020"-0.080" in order to permit rapid freezing of the plug. Larger diameter gates which provide large openings for rapid mold filling have not been successfully constructed using this technique to date, especially when molding thin sectioned parts.

It is therefore a principal object of the present invention to overcome the foregoing disadvantages and to provide a large opening for rapid filling of a mold cavity in injection molding while at the same time providing the necessary heating and cooling provisions in the injection nozzle and in the inlet conduit or gate leading to the mold cavity.

It is a further object of the present invention to provide an apparatus as aforesaid which may achieve these advantages with an injection nozzle having no moving parts.

Further objects and advantages of the present invention will appear hereinafter.

SUMMARY OF THE INVENTION

In accordance with the present invention, it has been found that the foregoing objects and advantages may be readily obtained.

The injection molding apparatus of the present invention comprises: a mold cavity; a heated injection nozzle adjacent the mold cavity; an elongated inlet conduit from said injection nozzle to said mold cavity; channel means in said heated injection nozzle communicating with said inlet channel for transmission of molten resin through said channel means to said inlet conduit and to said mold cavity; cooling means adjacent said inlet conduit to cool said inlet conduit operative to freeze molten resin in said inlet conduit after the mold cavity has been filed with molten resin; and insulating means between said cooling means and injection nozzle.

In a preferred embodiment, the cooling means includes a separate cooled plug adjacent the inlet nozzle and extending to the inlet conduit and to said mold cavity, wherein the inlet conduit is formed adjacent said plug and mold cavity. If desired, the plug may be seated in the mold cavity to form a hole in the molded part. In a preferred embodiment, the said inlet conduit is an annular, substantially continuous inlet conduit communicating with the channel means and mold cavity. The plug may be a cylindrical inner plug surrounded by the injection nozzle and insulated therefrom. The plug may include a leading end adjacent the mold cavity and a trailing end spaced from the mold cavity, including support flanges extending from the trailing end and including fluid cooling channels in at least one of the flanges wherein said cooling channels extend to said plug.

The injection nozzle may include a nozzle tip adjacent the inlet conduit and a nozzle body adjacent from and upstream of said nozzle tip, wherein said channel means pass through said nozzle body and nozzle tip and wherein the channel means in the nozzle body communicates with a source of molten resin. At least two nozzle channels may be provided in the nozzle body which mate with a corresponding number of nozzle channels in the nozzle tip. Each nozzle channel preferably branches into at least two nozzle channel legs in the nozzle tip, wherein said legs communicate with an annular nozzle channel adjacent the inlet conduit, said annular nozzle channel in turn communicating with said inlet conduit. The communication between the annular nozzle channel and the inlet conduit may include a continuous slot in said annular nozzle channel.

The inlet conduit may comprise a large diameter conduit having a width from 0.010 to 0.080". The large flow from the inlet conduit to the mold cavity is achieved by the elongated characteristics of the inlet conduit.

The apparatus of the present invention includes cooled mold plates forming said mold cavity and insulating means between the injection nozzle and at least one of said mold plates, wherein at least one of said mold plates is adjacent the inlet conduit for cooling said inlet conduit.

In an additional embodiment of the present invention, the inlet conduit is an elongated, substantially straight conduit, wherein the mold plates may provide the sole cooling means for the inlet conduit.

The apparatus of the present invention may include a heated manifold and heated distributor communicating with the injection nozzle, wherein the channel means in the injection nozzle communicates with a channel in the distributor and manifold.

The channel means in the nozzle may form an elongated substantially straight nozzle channel adjacent the inlet conduit, wherein said elongated nozzle channel in turn communicates with the inlet conduit. The communication between the elongated nozzle channel and the inlet conduit may include a continuous slot in the elongated nozzle channel.

Additional features of and advantages of the apparatus of the present invention will appear hereinbelow.

BRIEF DESCRIPTION OF THE DRAWINGS

The present invention will be more readily understandable from a consideration of the following illustrative drawings in which.

DETAILED DESCRIPTION

Figure 1:
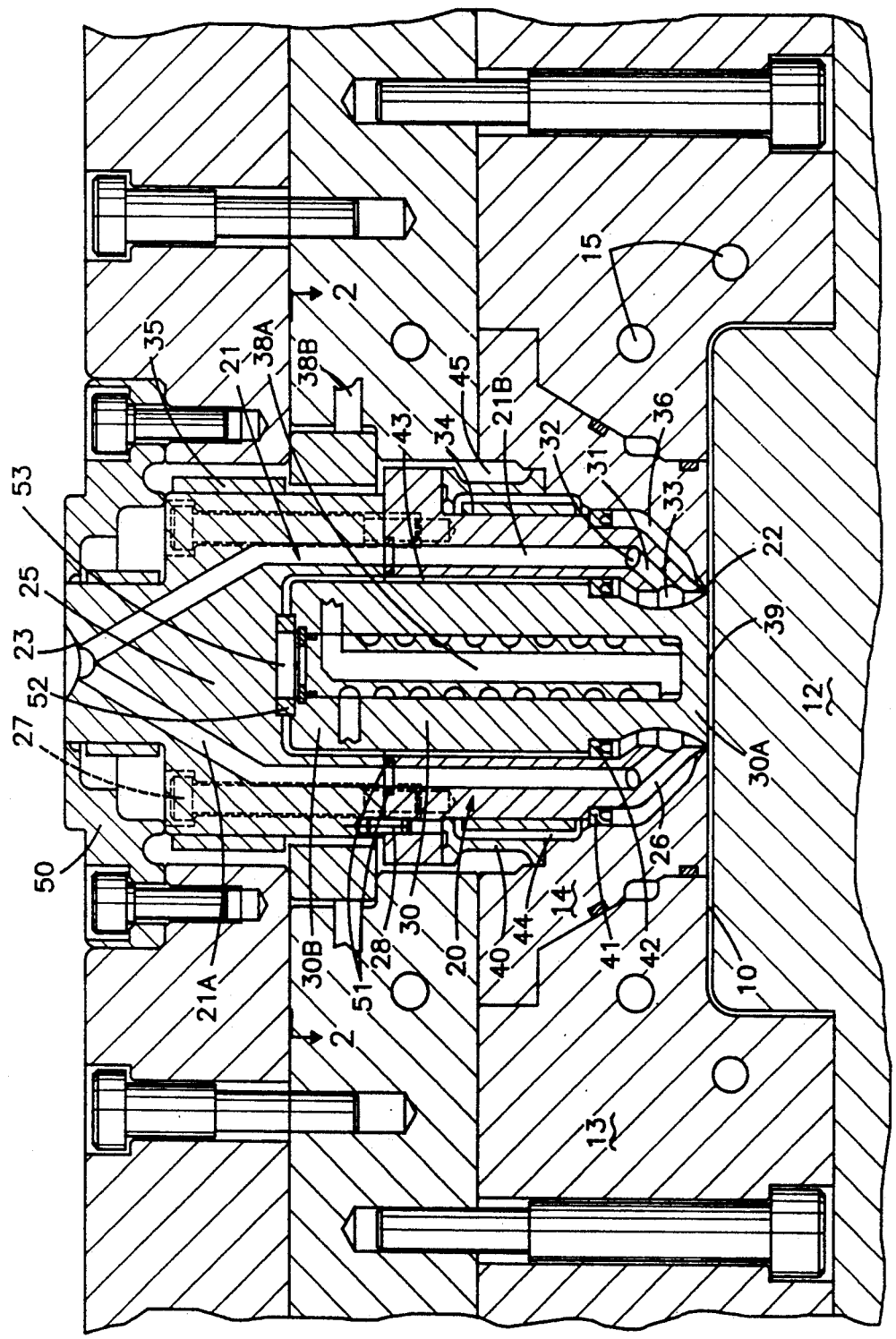
FIG. 1 is a partial sectional view of the apparatus of the present invention.

Referring to the drawings, FIG. 1 shows a partial sectional view of the apparatus of the present invention. FIG. 1 shows mold cavity 10 formed between core 12, mold 13 and gate pad 14 cooled by cooling channels 15. Core 12 is seated in mold 13 as shown in FIG. 1 to form the mold cavity 10 therebetween. The core is reciprocable towards and away from the mold. A plastic part is molded in mold cavity 10 when core 12 is seated in mold 13 as shown in FIG. 1. The core is then moved away from the mold by known means (not shown) in order to eject the molded part in a known manner.

Injection nozzle 20 includes channel means 21 communicating with inlet conduit 22 which in turn communicates with mold cavity 10. Thus, molten plastic is injected from a source of molten plastic (not shown) to channel means 21 and then to inlet conduit 22 and then to the adjacent mold cavity 10 to form the molded part in a manner as will be described below.

Figure 3:
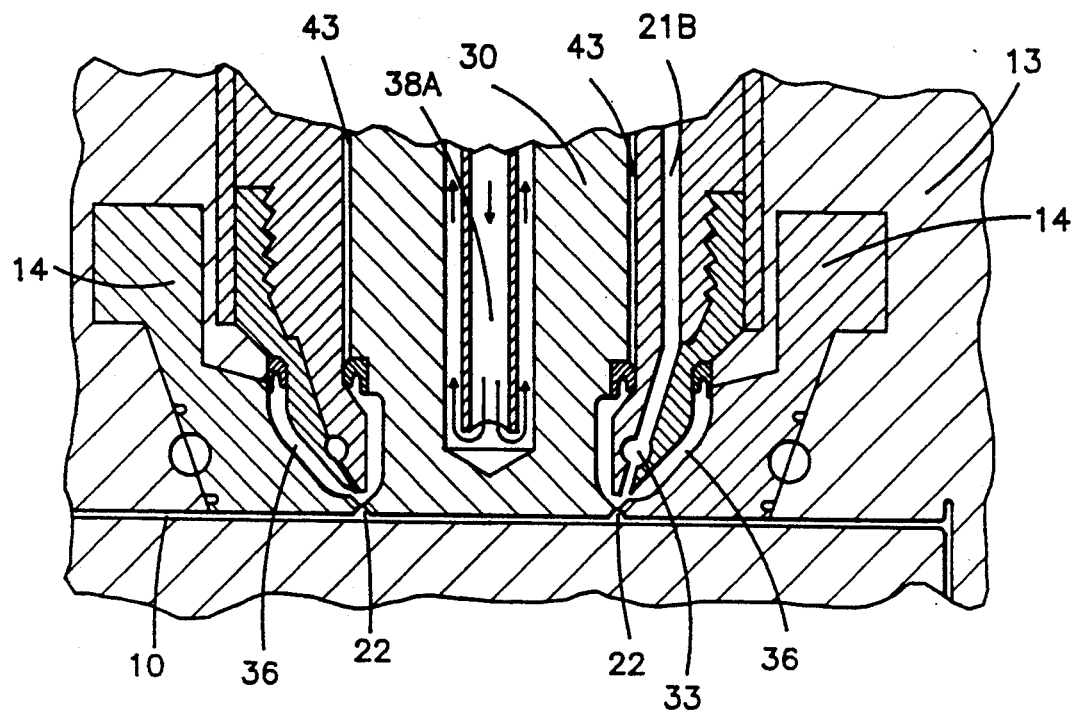
FIG. 3 is an enlarged sectional view showing an alternate nozzle tip and mold cavity.

As can be clearly seen in FIG. 3, the inlet conduit 22 is a large diameter annular channel directly adjacent the mold cavity to permit rapid filling of the mold cavity. In accordance with the present invention, the inlet conduit can be of any desired and convenient diameter, but is preferably limited in width to typically 0.010" to 0.080" in order to permit rapid freezing of the melt in the inlet conduit.

Injection nozzle 20 includes nozzle body 25 and nozzle tip 26. The body and tip are held together by screws 27 aligned with dowel 28. Cooled plug 30 is provided surrounded by the injection nozzle. Thus, the inlet conduit 22 is formed between two cooled mold parts, the inner plug 30 and the gate pad 14.

Channel means entry point 23 is provided in nozzle body 25 for communication with a source of molten plastic on the one hand and for communication with channel means 21 on the other hand. More than one channel means 21 is preferably provided in the injection nozzle 20 with two being shown in FIG. 1 and with three of said channel means representing a preferred embodiment as clearly shown in FIG. 2. Thus, entry point 23 communicates with three nozzle body channel means 21A in nozzle body 25 wherein the three channel means 21A meet at entry point 23 and align with and communicate with three corresponding nozzle tip channel means 21B in nozzle tip 26. Nozzle tip channels 21B each branch into two branch channels 31 at branch point 32 forming six equispaced branch channels to supply plastic melt to annular channel means 33. The annular channel means 33 is formed between nozzle tip 26 and inner plug 30 immediately upstream from inlet conduit 22 and in FIG. 1 extends circumferentially around plug 30. Molten plastic is then fed from annular channel means 33 to inlet conduit 22 and thence to mold cavity 10. Heating means 34 are provided adjacent nozzle tip 26 to heat nozzle tip channel means 21B and heating means 35 are provided adjacent nozzle body 25 to heat nozzle body channel means 21A. Molten resin will flow into bubble area 36 touching cooled gate pad 14 and remains permanently frozen therein and acts as a thermal insulator between the melted resin and the cool mold surfaces.

Nozzle tip 26 is supported on thermal insulators 40, 41 and 42. Insulator 42 is preferably a titanium alloy ring surrounding plug 30 and locating nozzle tip 26 to maintain an insulating air gap 43 between the nozzle tip and the plug. Insulator 41 is preferably a second titanium alloy ring which locates and spaces nozzle tip 26 from gate pad 14. Insulator 40 is preferably a steel cylinder that structurally supports nozzle tip 26 on gate pad 14 while maintaining insulating air gaps 44 and 45 between the components.

Inner plug 30 includes a leading end 30A adjacent mold cavity 10 and a trailing end 30B spaced from mold cavity 10. Plug 30 is a cylindrical component with three laterally extending support flanges 37 extending from trailing end 30B. The flanges and plug contain fluid cooling channels 38A supplied by cooling pipe 38B to cool the molding surface 39 of plug 30. Nozzle body 25 includes three legs 29 that pass between plug flanges 37. The nozzle body 25 is spaced from the cooled mold plates by locator ring 50, preferably a steel locator ring. Channel means 21A and 21B are sealed with sealing rings 51. Insulator 52, preferably titanium alloy or steel, supports nozzle body 25 on plug 30 and maintains an insulating air gap 53 therebetween.

Thus, in operation the melted resin is injected at entry point 23, flows through nozzle body channel means 21A and nozzle tip channel means 21B, passes to the six equispaced branch channels 31 at branch point 32 and thence to annular channel 33 and inlet conduit 22 to fill mold cavity 10. When filling is complete, the resin in the inlet conduit 22 freezes while the resin upstream is maintained molten by the heated nozzle tip 26 and the heated nozzle body 25. After the molded part has cooled and ejected, the mold is closed and resin is again injected into the closed mold. The injection pressure forces the frozen annular plug in the gate area into the mold cavity effectively opening the annular inlet conduit to permit filling of the mold cavity. The cycle is then repeated.

The width of the annular inlet conduit is preferably such as to permit rapid freezing of the resin therein. However, the length of the inlet is virtually unlimited except by part dimensions and practical considerations.

Figure 2:
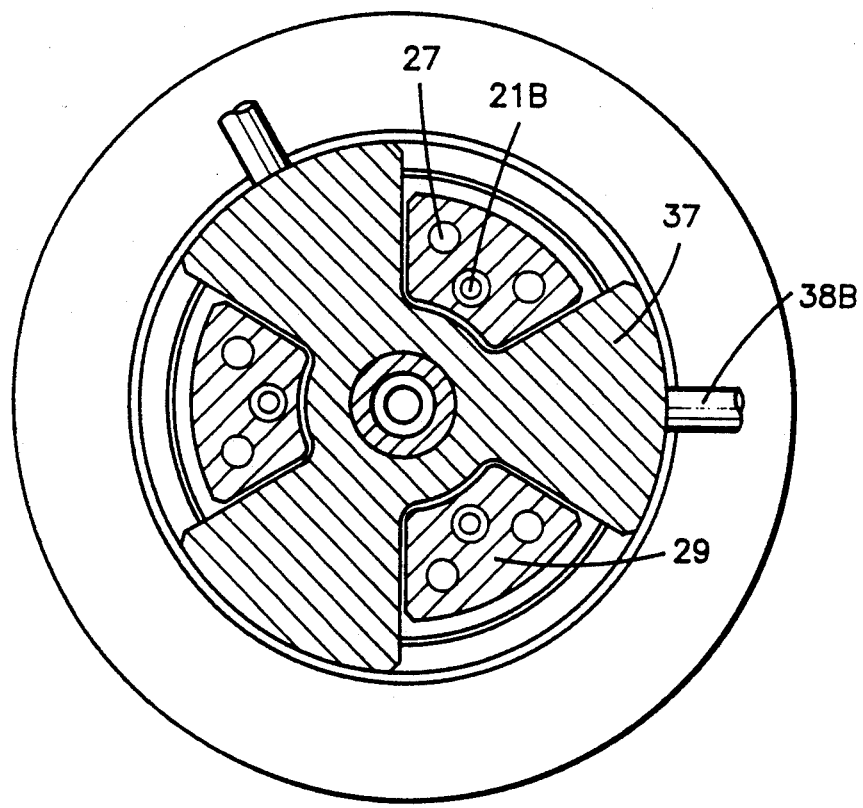
FIG. 2 is a partial sectional view along line II—II of FIG. 1.
Figure 4:
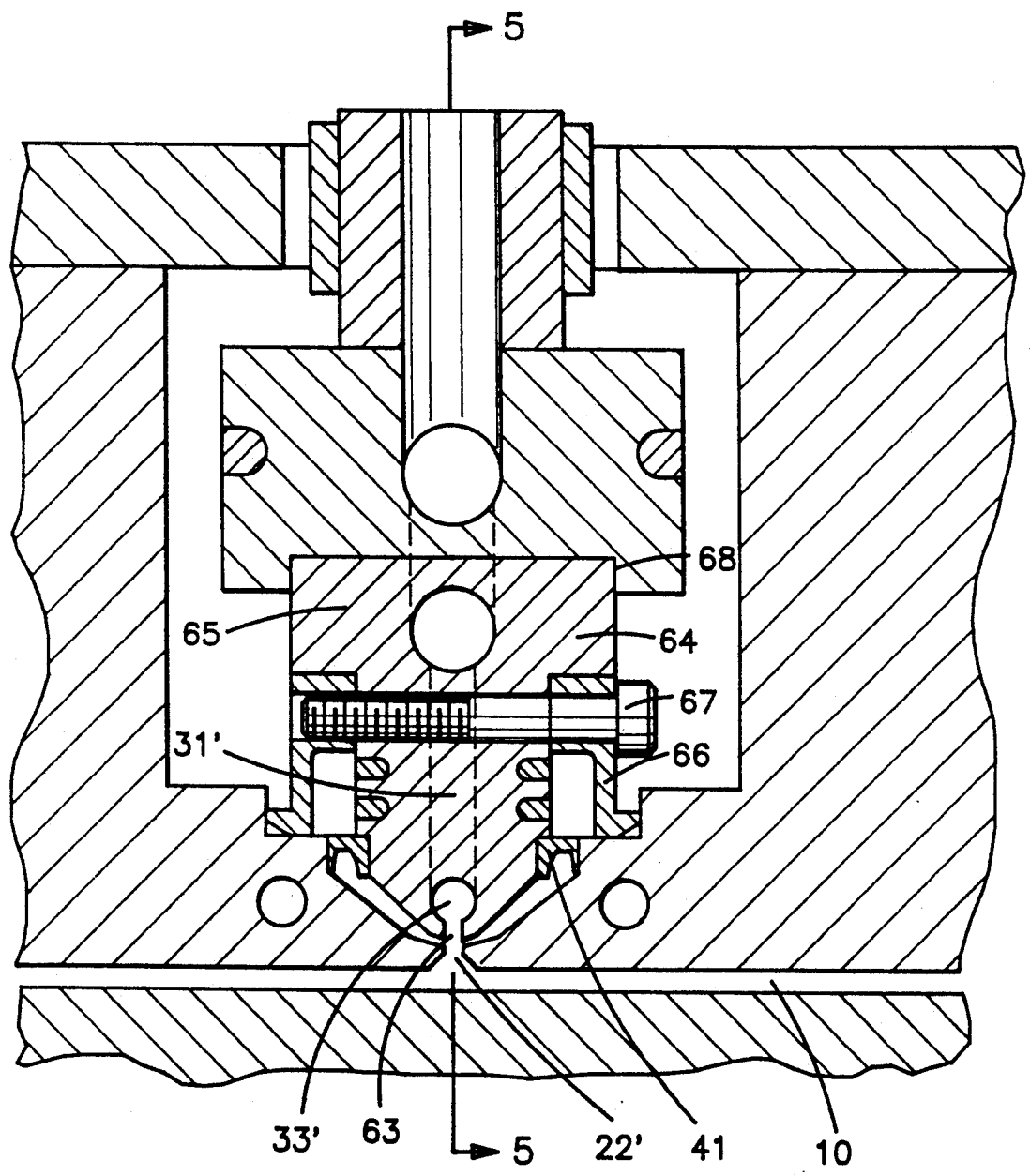
FIG. 4 is a sectional view of an alternate embodiment of the apparatus of the present invention showing a substantially straight inlet conduit to the mold cavity.
Figure 5:
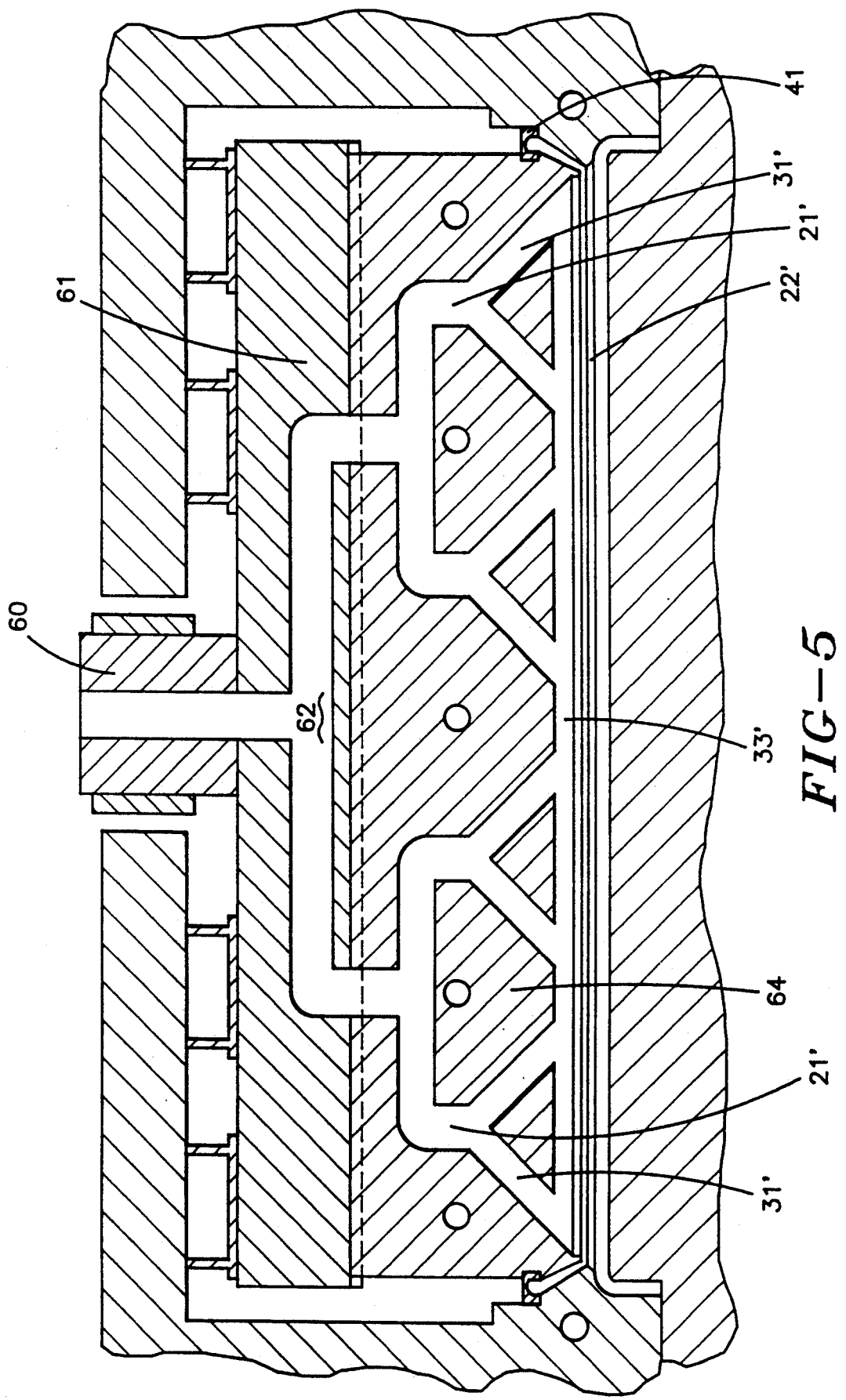
FIG. 5 is a sectional view through line V—V of FIG. 4.
Figure 6:
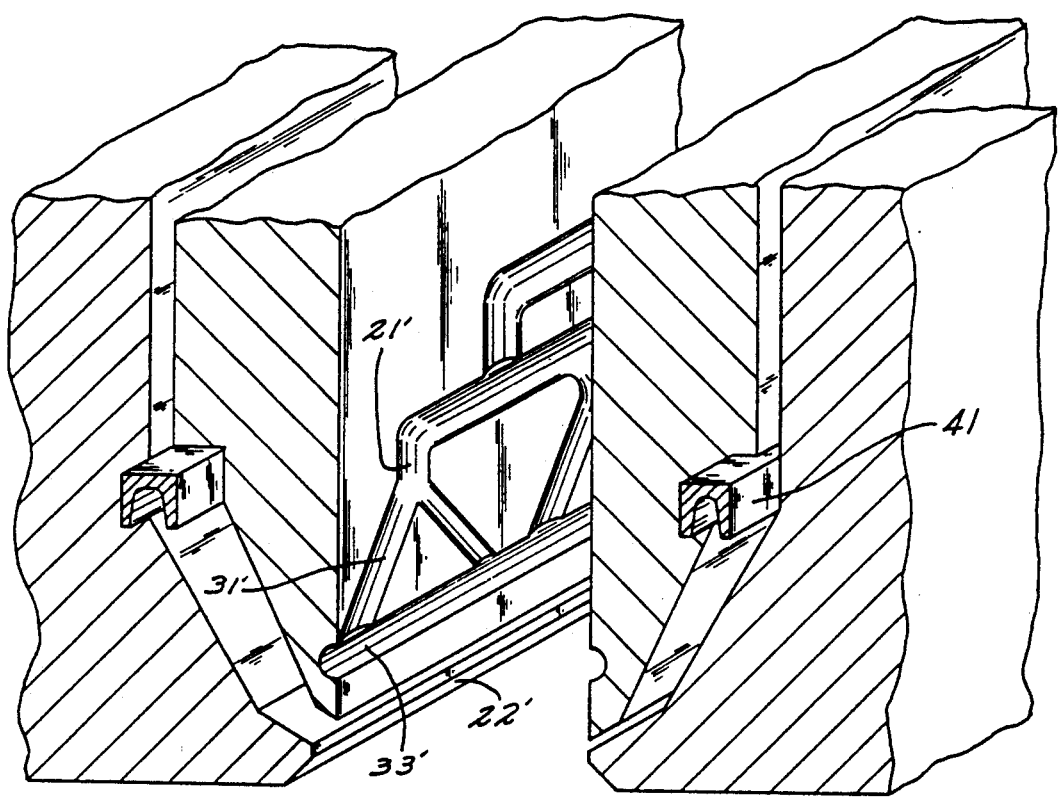
FIG. 6 is a partial perspective view of the nozzle tip of FIG. 4.

Any convenient configuration may be used for the inlet conduit, such as the annular configuration shown in FIGS. 1-3. Alternatively, one may employ an elongated, substantially straight inlet conduit as shown in FIGS. 4-6 which show a substantially straight slotted gate. Referring to FIG. 5, molten resin enters through heated bushing 60 and heated manifold 61 via flow channel 62. Flow channel 62 splits in the manifold and thereafter distributes molten resin equally to channel means 21' and branch channel 31' such that the melt is supplied to final nozzle channel means 33' with substantially the same heat history along the entire length of channel means 33'. Final nozzle channel means 33' is a substantially straight, elongated channel substantially corresponding to substantially straight inlet conduit 22'. One side of channel 33' is open and forms a continuous slot 63 as clearly shown in FIG. 4 so that the resin is fed from channel means 33' into inlet conduit.

Channels 31', 21' and 33' are machined into each half of distributor 64 and 65 which when assembled between insulators 66 are fastened with bolts 67 form a distributor assembly. The bolts pass through clearance holes in the distributor valves so that the thermal expansion of the distributor does not cause interference between the bolts and the distributor. The distributor is also spaced away from the cooled mold plates by insulators 41 and is retained in slot 68 cut through the lower half of manifold 61. The distributor must resist the internal melt pressure in the melt channels and since it is made in two halves, it must be well supported to resist this pressure. Thus, there are three support means, the slot 68, the bolts 67 and the insulators 41, 66 which trap the distributor assembly between the sides of the cooled mold cavity.

Thus, a molded part can be formed by introducing the resin along one side of the part or along a centerline to achieve rapid filling in an advantageous manner. If very large parts are desired, one may employ intermediate support means connecting the two sides of the cooled cavity and passing through clearance holes in the manifold or distributor in order to resist the internal melt pressure.

Figure 7:
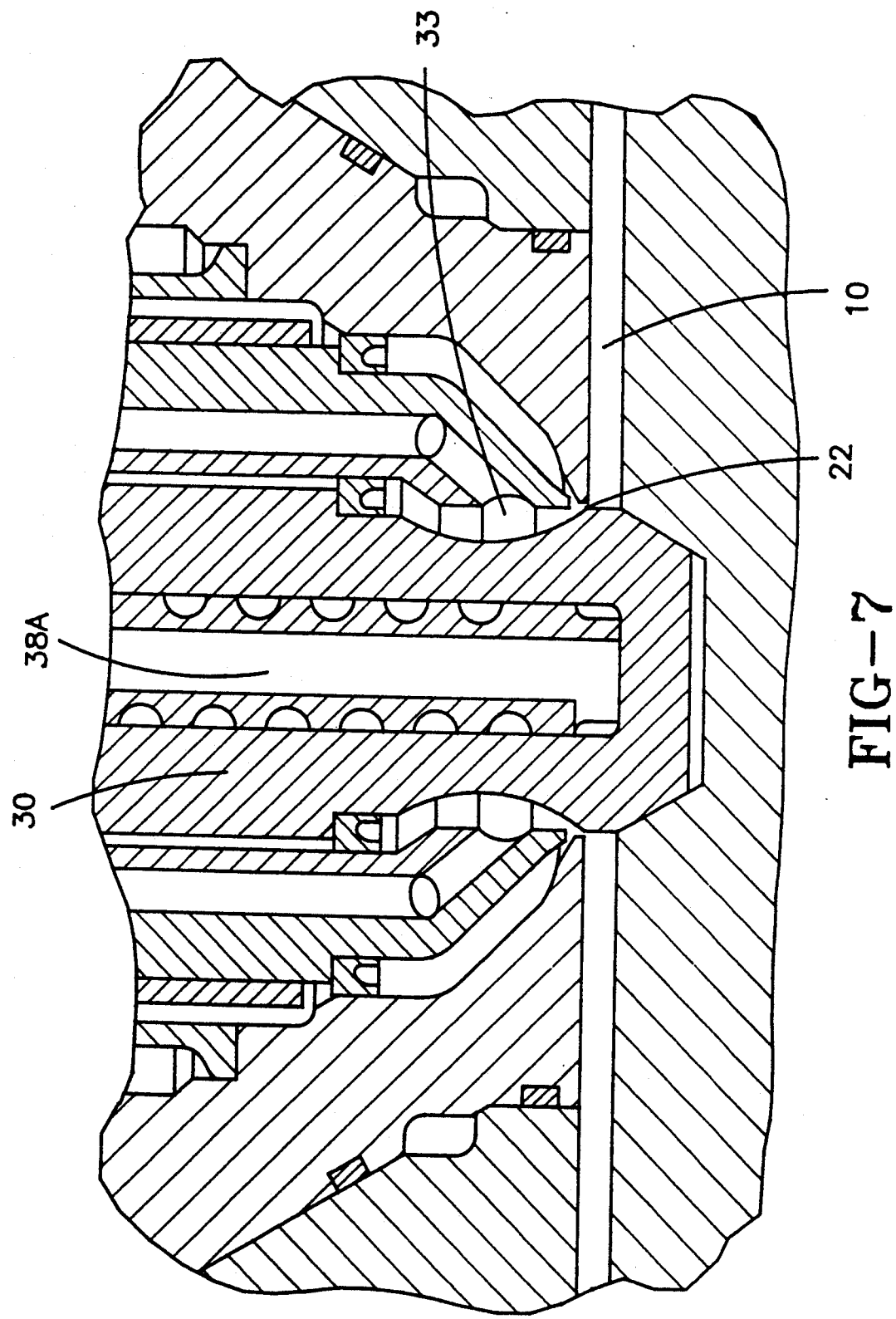
FIG. 7 is a partial sectional view similar to FIG. 3 showing an alternate embodiment of the present invention.

In accordance with the embodiment of FIG. 7, central plug 30 may be seated in mold cavity 10 to form a molded part with a central hole therein, as for example, a compact disc. The resin is introduced into the mold cavity from inlet conduit 22 surrounding the central plug 30.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Injection molding apparatus for forming a molded part which comprises: a mold cavity formed by first and second mold plates; a heated injection nozzle adjacent the mold cavity; an elongated inlet conduit from said injection nozzle in communication with said mold cavity; channel means in said heated injection nozzle communicating with said inlet conduit for transmission of molten resin through said channel means to said inlet conduit and to said mold cavity; cooling means adjacent said inlet conduit to cool said inlet conduit operative to freeze molten resin in said inlet conduit after the mold cavity has been filled with molten resin; and insulating means between said cooing means and injection nozzle, wherein said channel means in the heated nozzle comprises at least two nozzle channels which divide into nozzle channel branches which in turn communicate with a further nozzle channel upstream from the inlet conduit; wherein the further nozzle channel feeds molten resin to the inlet conduit, and wherein said cooling means includes a separate cooled plug adjacent the injection nozzle and extending to the inlet conduit and to the mold cavity, wherein said inlet conduit is formed between said plug and said injection nozzle and adjacent said mold cavity.

2. Injection molding apparatus according to claim 1 wherein said inlet conduit is an annular, substantially continuous inlet conduit communicating with said channel means and with said mold cavity.

3. Injection molding apparatus according to claim 2 wherein said plug is a cylindrical inner plug surrounded by said injection nozzle and insulated therefrom.

4. Injection molding apparatus according to claim 3 wherein said plug has a leading end adjacent said mold cavity and a trailing end spaced from said mold cavity, including support flanges extending from said trailing end and including fluid cooling channels therein, wherein said cooling channels extend to said plug.

5. Injection molding apparatus according to claim 4 wherein said injection nozzle includes a nozzle tip adjacent said inlet conduit and a nozzle body adjacent and upstream of said nozzle tip, wherein said channel means pass through said nozzle body and nozzle tip and wherein the channel means in said nozzle body communicate with a source of molten resin.

6. Injection molding apparatus according to claim 5 including at least two nozzle channels in said nozzle body which mate with a corresponding number of channels in said nozzle tip.

7. Injection molding apparatus according to claim 5 wherein each nozzle channel divides into at least two nozzle channel branches in the nozzle tip, wherein said branches communicate with an annular nozzle channel adjacent said inlet conduit, said annular nozzle channel in turn communicating with said inlet conduit.

8. Injection molding apparatus according to claim 7 wherein said communication between the annular nozzle channel and the inlet conduit includes a continuous slot in said annular nozzle channel.

9. Injection molding apparatus according to claim 1 wherein the inlet conduit is a large diameter conduit having a width of from 0.010" to 0.080".

10. Injection molding apparatus according to claim 1 including insulating means located between and insulating said injection nozzle and at least one of said mold plates, wherein at least one of said mold plates is adjacent said inlet conduit.

11. Injection molding apparatus according to claim 10 wherein said inlet conduit is an elongated substantially straight conduit.

12. Injection molding apparatus according to claim 8 wherein said mold plates provide said cooling means for said inlet conduit.

13. Injection molding apparatus according to claim 11 including a heated manifold and heated distributor including channel means communicating with said injection nozzle, wherein the channel means in the injection nozzle communicate with channel means in the distributor and manifold.

14. Injection molding apparatus according to claim 11 wherein the channel means in the nozzle form an elongated substantially straight nozzle channel adjacent said inlet conduit, wherein said elongated nozzle channel in turn communicates with said inlet conduit.

15. Injection molding apparatus according to claim 14 wherein the communication between the elongated nozzle channel and inlet conduit includes a continuous slot in the elongated nozzle channel.

16. Injection molding apparatus according to claim 2 wherein said plug is seated in the mold cavity to form a hole in the molded part.

17. Injection molding apparatus according to claim 1 wherein all components thereof are fixed in position whereby there are no moving parts from the injection nozzle to the mold cavity.

18. Injection molding apparatus according to claim 1 including a bubble area adjacent said cooling means and communicating with said further nozzle channel for receiving and permanently freezing resin therein to act as a thermal insulator.

* * * * *

UNITED STATES PATENT AND TRADEMARK OFFICE
CERTIFICATE OF CORRECTION

PATENT NO. : 5,219,593

DATED : June 15, 1993

INVENTOR(S) : HARALD SCHMIDT ET AL.

It is certified that error appears in the above-identified patent and that said Letters Patent is hereby corrected as shown below:

In Column 1, line 45, delete "both abandoned,";

In Column 1, line 45, after "707,660" insert --, now U.S. Patent No. 5,162,125,--;

In Column 1, line 46, after "1991" insert --, now abandoned--;

In Column 6, claim 1, line 45, delete "cooing" and insert --cooling--;

In Column 8, claim 12, line 4, change "claim 8" to read --claim 11--; and

In Column 8, claim 16, line 22, change "claim 2" to read --claim 1--.

Signed and Sealed this

Nineteenth Day of July, 1994

Attest:

BRUCE LEHMAN

*Attesting Officer*     *Commissioner of Patents and Trademarks*